April 3, 1956     K. WESTLUND     2,740,259
APPARATUS FOR CONVERTING GAS PRESSURE
TO HYDRAULIC PRESSURE
Filed May 1, 1952
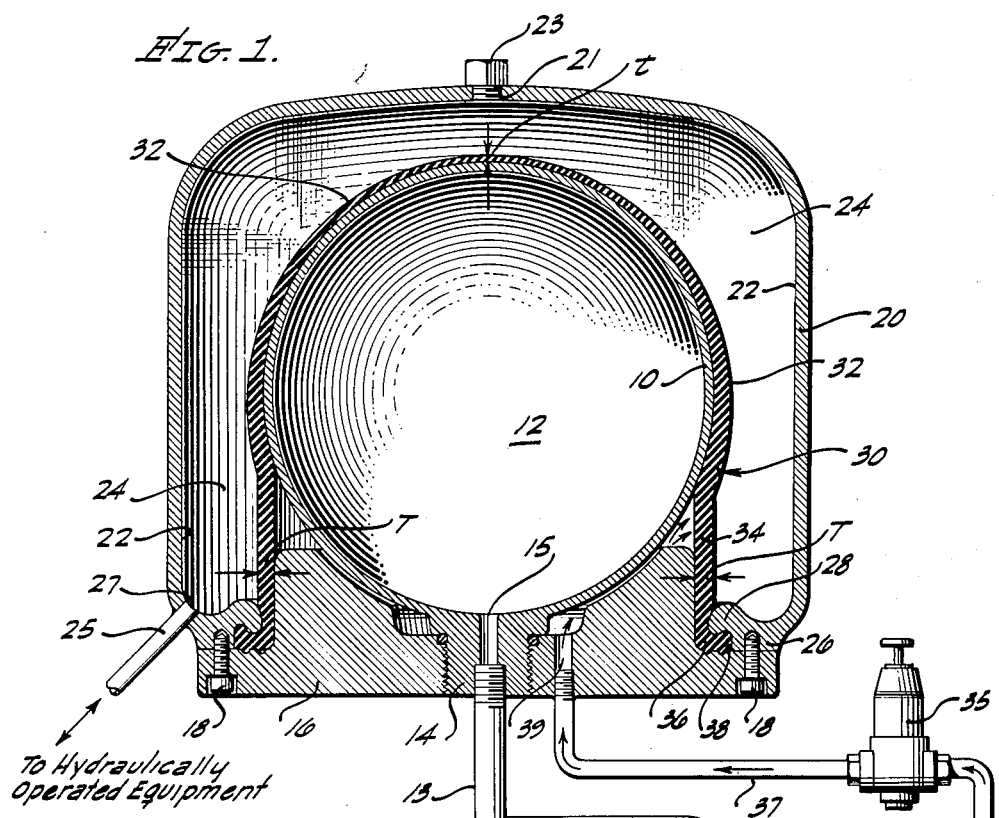
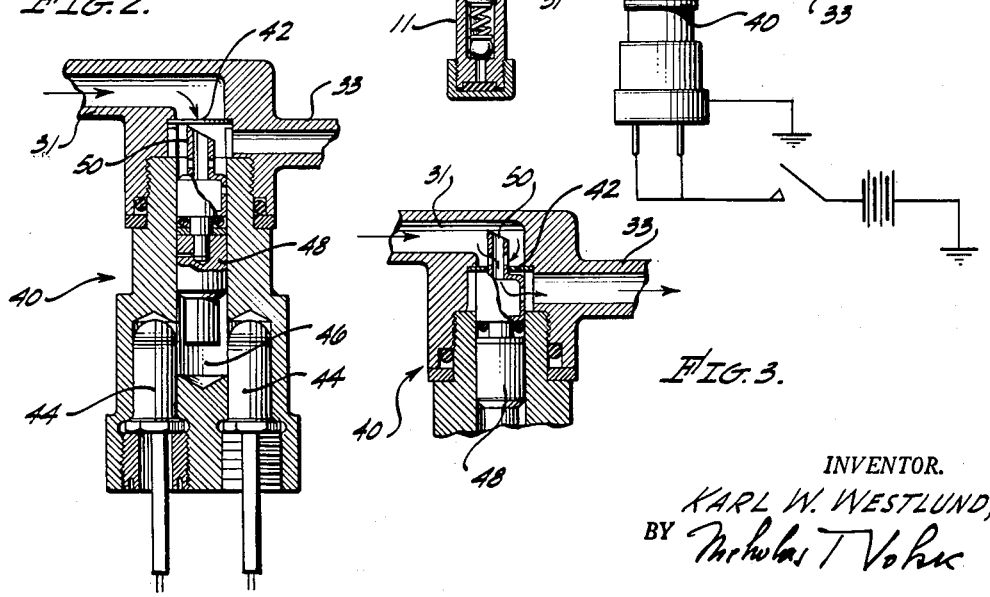
INVENTOR.
KARL W. WESTLUND,
BY *Nicholas T. Vohr*
ATTORNEY.

United States Patent Office 2,740,259
Patented Apr. 3, 1956

2,740,259

APPARATUS FOR CONVERTING GAS PRESSURE TO HYDRAULIC PRESSURE

Karl Westlund, Los Angeles, Calif., assignor, by mesne assignments, to Hughes Aircraft Company, a corporation of Delaware Application May 1, 1952, Serial No. 285,468

8 Claims. (Cl. 60—54.6)

This invention relates to devices for producing hydraulic pressure and more particularly to such devices in which gas pressure is instantly convertible to hydraulic pressure for supplying hydraulic power to isolated hydraulically operated equipment.

The use of hydraulic power for operating various mechanisms has become standard procedure where constant and positive forces are required, and where movements must be regulated with great precision. For example, many items of an expendable nature, such as pilotless aircraft control equipment, often include mechanisms which depend for their successful operation upon a reliable source of hydraulic power. Although this power is needed for only a limited period of time, it must be positive, and it must be instantaneously available in response to a selected signal.

In the design of air-borne equipment where space and weight are important factors, compressed gas is an ideal source of potential energy for creating hydraulic power. The present invention makes use of this form of energy by combining into a single unit a chamber for compressed gas and a chamber for hydraulic fluid with adequate means for applying the gas pressure to the hydraulic fluid whereby the gas pressure is converted into hydraulic pressure.

More particularly, the converter according to the present invention includes a first rigid vessel having a chamber therein for holding the compressed gas, an expansible bladder surrounding the first vessel, a second rigid vessel surrounding the bladder in spaced relationship such that the space between the inner wall of the second vessel and the outer surface of the bladder forms a second chamber for holding the hydraulic fluid, and control means connected between the first vessel and the bladder for selectively applying the compressed gas to the inner surface of the bladder to expand the bladder and expel the fluid from the second chamber.

It is an object of this invention to provide a self-contained unit in which a highly compressed gas is converted into hydraulic power.

Another object is to provide a unitary pressure converter of this character, which is suitable for use in the control systems of self-propelled equipment.

It is still another object to provide such a converter in which hydraulic pressure can be made instantaneously available in response to self-contained signal means or preselected signals from an external source.

It is a further object to provide such a converter which includes a gas-pressure chamber suitable for charging to pressures of the order of 6000 pounds per square inch.

An additional object is to provide such a converter in which a hydraulic-pressure chamber surrounds the gas-pressure chamber.

It is another object to provide such a converter with a bladder which surrounds the gas-pressure chamber in a manner to form an elastic wall of the hydraulic-pressure chamber.

It is another object to provide a converter of this character in which the bladder is particularly adapted to expand in a manner such as to expel substantially all hydraulic fluid from the hydraulic pressure chamber.

Still another object is to provide such a converter which includes control means responsive to a predetermined or preselected signal for instantaneously releasing pressure from the gas-pressure chamber for inflating the bladder to pressurize the hydraulic-pressure chamber.

A further object of this invention is to provide such a control means in which pressure is released from the gas-pressure chamber in response to the explosion of a squib fired in response to a preselected signal.

A still further object is to provide such a control means which includes a pressure regulator for controlling the flow of pressure from the gas-pressure chamber for the purpose of maintaining a lower but uniform pressure in the fluid pressure chamber.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 is a sectional view of a unitary pressure converter embodying this invention;

Fig. 2 is a sectional view of the signal responsive means; and

Fig. 3 is a fragmentary view of Fig. 2.

Referring to Fig. 1, the unitary pressure converter of this invention comprises a rigid spherical vessel 10 having a chamber 12 therein and mounted by means of a threaded boss 14 to a base plate 16. Also attached to base plate 16, by means of a plurality of screws 18, is a second rigid vessel 20 of a generally cylindrical shape and having an inside wall 22 surrounding vessel 10 in spaced relationship therewith to provide a chamber 24.

An elastic receptacle or bladder, indicated generally by reference numeral 30, includes a hemispherical portion 32 circumferentially adjacent vessel 10, as illustrated. Bladder 30 further includes a cylindrical portion 34 extending from portion 32 and terminating in a flange portion 36 having a bead 38. Flange portion 36 is tightly secured between base plate 16 and a closure rim 26 of vessel 20 by the clamping action of screws 18. As illustrated, rim 26 includes an annular bead 28 for engagement with bead 38 of bladder 30 to positively hold flange portion 36 in the position shown. Flange portion 36 also operates as a gasket for sealing chamber 24 where vessel 20 joins base 16, and for sealing bladder 30 against fluid pressure loss when the bladder is inflated in a manner to be later described.

Preparatory to the operation of the converter, chamber 24 is filled with suitable liquid either through an opening 21 located in vessel 20 and normally closed by a plug 23, or through an outlet conduit 25 which terminates in an output opening 27 in inside wall 22 of vessel 20. In either case, plug 23 is removed to insure the escape of all air from the chamber 24 during the filling operation. Also in preparation for operating the converter, chamber 12 of vessel 10 is coupled to a source, not shown, of compressed gas and charged thereby to a desired pressure level through a check valve 11 and a conduit 13 which is threadedly connected to a bore 15 extending through boss 14. After the pressure in chamber 12 has reached the desired level, the source is uncoupled and valve 11 operates to prevent any loss of pressure from chamber 12.

When chamber 24 is filled with liquid, and chamber 12 is charged with compressed gas, the operation of the converter is controlled by means of an operating valve 40. When valve 40 is opened, compressed gas from chamber 12 is conducted through a passageway comprising conduit 13, a conduit 31, operating valve 40, a conduit 33, a pressure regulator 35, a conduit 37, and a bore 39 extending through base plate 16. From bore 16 the gas passes around the outside of vessel 10 and inside of portions 32 and 34 of bladder 30, as indicated by the arrows.

As previously stated, bladder 30 is constructed of elastic material, and, therefore, the application of gas pressure to the inside of portions 32 and 34 will effectively inflate the bladder and urge it to expand. Thus, the tendency of the bladder to expand causes pressure to be exerted against the fluid in chamber 24. In this manner bladder 30 through its portions 32 and 34 becomes an expansible wall of chamber 24.

Assume now for purposes of illustration, that chamber 12 is charged with compressed gas to a pressure of 6000 pounds per square inch, and that hydraulic equipment not shown, communicating with chamber 24 by means of outlet conduit 25, operates at a pressure of 1500 pounds per square inch. Then, with regulator 35 properly adjusted, the opening of valve 40 will cause bladder 30 to be inflated and the bladder, operating as an expansible wall, will squeeze the liquid in chamber 24 through outlet opening 27 in wall 22 of vessel 20. As the volume of liquid in chamber 24 decreases, sufficient gas is allowed to pass regulator 35 to continue the inflation of bladder 30 in order to maintain the desired hydraulic pressure. This process will continue until all the liquid in chamber 24 has been forced through opening 27, and the outer surface of bladder 30 is completely in contact with inside wall 22 of vessel 20.

To avoid the possibility of the bladder isolating or trapping fluid between its outer surface and inside wall 22 of vessel 20, and to insure the complete expulsion of all liquid from chamber 24, bladder 30 is constructed thinner at the crown of hemispherical portion 32, as indicated at $t$, with a gradual increase in thickness until a maximum is reached near the bottom of cylindrical portion 34, as indicated at $T$. With this construction the outer surface of the bladder begins its contact with the inside wall 22 at or near the bottom of plug 23 from which the area of contact progressively increases until complete contact between the bladder and inside wall 22 is achieved at outlet opening 27. Thus bladder 30, operating as an expansible wall for chamber 24, is able to force all the liquid from the chamber when the bladder is inflated under adequate pressure.

It is to be noted that the progression of the contact between the outside of bladder 30 and inside wall 22 of vessel 20 is controlled so as to force all the liquid from chamber 24, and that this control is accomplished by the position and shape of the vessel 10 within and with respect to the vessel 20 as well as by the difference in wall thickness of the bladder.

As set forth above, the flow of compressed gas from chamber 12 for inflating bladder 30 is controlled by operating valve 40, while the rate of flow of the gas is controlled by pressure regulator 35. Both valve 40 and regulator 35 may be constructed in accordance with designs well known in the art where simple manual operation is desired. However, valve 40 may also be constructed for remote operation, as illustrated by the structure shown in Figs. 2 and 3.

In Fig. 2, valve 40 is a normally closed single-action valve which includes a disc 42 interposed between conduits 31 and 33, and a cylinder 46 which extends downwardly from the disc. Slidably mounted within cylinder 46 is a piston 48 having a hollow piercing punch 50 attached to one end thereof and extending toward disc 42. A pair of squibs 44 located in the body of valve 40 are positioned in suitable bores communicating with cylinder 46, and thus provide means for actuating piston 48.

In response to a preselected signal, squibs 44 are fired and the resulting expansion of gases forces piston 48 upward, which in turn forces hollow piercing punch 50 through disc 42 to open valve 40 and permit gas to flow from conduit 31 to conduit 33, as illustrated in Fig. 3.

The signal for firing squibs 44 may be an electrical signal originating from the equipment requiring hydraulic power, or it may originate at one or more points widely separated from each other and from the converter. In any case, the signal is adapted to instantaneously actuate valve 40 to provide hydraulic pressure for a wide variety of hydraulically operated equipment.

The means for operating valve 40 by remote control need not be limited to the use of squibs as shown, since selsyn motors or other electromagnet devices are adaptable for the purpose, particularly where it is desired to close as well as open the valve.

What is claimed as new is:

1. Apparatus for converting gas pressure to hydraulic pressure, said apparatus comprising: an outer rigid vessel having an outlet; an inner rigid vessel mounted within said outer vessel in spaced relationship with respect to said outer vessel; an expansible bladder substantially surrounding said inner vessel and having an internal surface normally adjoining the outer surface of said inner vessel; a compressed gas within said inner vessel; a hydraulic fluid filling the space between the outer surface of said bladder and the inner surface of said outer vessel; and pressure control means for conveying compressed gas from said inner vessel to and between the adjoining surfaces of said bladder and said inner vessel for expanding said bladder and expelling said hydraulic fluid under pressure through said outlet, said means being operable to cause the expansion of said bladder into overall contact with the inner surface of said outer vessel and to maintain a substantially constant gas pressure against the internal surface of said bladder throughout said expansion.

2. The apparatus defined in claim 1 in which said outer vessel comprises a hollow cylindrical member having one open end, said open end including a closure rim; and said inner vessel comprises a hollow substantially spherical member having a base plate adapted to engage said rim and close the open end of said cylindrical member; and said bladder comprises an elastic member having a hemispherical portion surrounding a portion of said spherical member, and a cylindrical portion terminating in a circumferential flange projecting radially outward, said flange being securely held between said rim and said base plate for maintaining an operative relationship between said elastic member, said spherical member, and said cylindrical member.

3. In a converter for converting gas pressure to hydraulic pressure: a first rigid vessel having an outer wall and a first chamber for holding compressed gas; an expansible bladder circumjacent the outer wall of the first vessel for forming an expansible chamber around said first vessel; a second rigid vessel associated with the first vessel and the bladder, said second vessel having a wall surrounding said bladder such as to provide a contractible chamber for holding liquid and for expelling this liquid under pressure in response to expansion of the bladder; outlet means communicating with the contractible chamber; and means for transferring compressed gas from the first chamber to said bladder for expanding the expansible chamber and contracting the contractible chamber for expelling liquid under pressure from said contracting chamber through the outlet means, said transferring means including means for maintaining a predetermined gas pressure within said expansible chamber.

4. An apparatus for converting gas pressure to hydraulic pressure, said apparatus comprising: a first rigid vessel having a first chamber for holding compressed gas; a second rigid vessel having an inside wall surrounding said first vessel in spaced relationship therewith to form a second chamber for holding liquid under pressure, said second vessel having an opening communicating with the second chamber for supplying hydraulic pressure to hydraulically operated equipment; and first means for applying pressure to liquid in said second chamber, said first means including an elastic bladder circumjacent the outside of said first vessel for forming an expansible third chamber to reduce the volume of said second chamber, second means coupled to said first chamber and said bladder for permitting compressed gas from said first chamber to enter and expand said third chamber in response to a preselected signal, and pressure regulating means for maintaining a gas pressure of constant value within said expansible third chamber whereby constant pressure is applied to liquid in the second chamber for providing constant hydraulic pressure to hydraulically operated equipment.

5. The apparatus defined in claim 4 in which said second means includes a conduit for conveying compressed gas from said first chamber to said bladder; an element normally blocking said conduit; and piercing means for perforating said element in response to said preselected signal.

6. The apparatus defined in claim 5 in which said piercing means includes a piston actuated punch; and an explodable squib for actuating said piston, said squib being exploded in response to said preselected signal.

7. In a pressure converting apparatus having a first rigid vessel with a first chamber for holding compressed gas, a second rigid vessel with a second chamber surrounding the first vessel for holding hydraulic fluid, and first means for converting compressed gas in the first chamber into hydraulic pressure in the second chamber, said first means comprising: an expansible elastic bladder associated with the first and second vessels such that expansion of the bladder reduces the volume of the second chamber and applies pressure to hydraulic fluid in said second chamber; and second means for conducting compressed gas from the first chamber to the bladder in response to a preselected signal, said second means including a normally closed conduit interconnecting said first chamber and said bladder, and explodable means operable in response to said preselected signal for opening said normally closed conduit, whereby compressed gas from the first chamber is permitted to enter and expand the bladder.

8. In a pressure converting apparatus having a first rigid vessel with a first chamber containing compressed gas, a second rigid vessel with a second chamber containing hydraulic fluid surrounding the first chamber, an outlet for connecting the second chamber to hydraulically actuated equipment, and first means responsive to a preselected signal for converting the compressed gas into hydraulic-fluid pressure for the hydraulically actuated equipment, said first means comprising: an elastic bladder contiguously disposed around the first rigid vessel, and expandably operable for providing pressure to the hydraulic fluid contained in the second chamber; a gas-conducting conduit interconnecting the first chamber and said bladder; an element normally closing said conduit to prevent compressed gas from operating said bladder; piston means adapted to pierce said element and open said conduit; and explodable means responsive to the preselected signal for actuating said piston means, whereby said bladder is caused to automatically pressurize the hydraulic fluid contained in the second chamber.

References Cited in the file of this patent

UNITED STATES PATENTS

| | | |
|---|---|---|
| 2,337,771 | Roberts | Dec. 28, 1943 |
| 2,351,761 | Hanna | June 20, 1944 |
| 2,459,317 | Grandberg | Jan. 18, 1949 |
| 2,478,958 | Wheeler et al. | Aug. 16, 1949 |
| 2,515,068 | Young | July 11, 1950 |
| 2,561,957 | Teague | July 24, 1951 |
| 2,621,608 | McIntyre | Dec. 16, 1952 |
| 2,621,719 | Eaton et al. | Dec. 16, 1952 |